(12) United States Patent
Hanafin et al.

(10) Patent No.: US 8,336,807 B2
(45) Date of Patent: Dec. 25, 2012

(54) COMBINED HELICOPTER LANDING PAD AND CLAMSHELL ENCLOSURE

(76) Inventors: Bernard Hanafin, Annandale, NJ (US); George Vermesi, Monroe, WA (US)

(*) Notice: Subject to any disclaimer, the term of this patent is extended or adjusted under 35 U.S.C. 154(b) by 326 days.

(21) Appl. No.: 12/812,314

(22) PCT Filed: Jan. 9, 2009

(86) PCT No.: PCT/US2009/030595
§ 371 (c)(1),
(2), (4) Date: Sep. 3, 2010

(87) PCT Pub. No.: WO2009/089449
PCT Pub. Date: Jul. 16, 2009

(65) Prior Publication Data
US 2010/0320313 A1  Dec. 23, 2010

Related U.S. Application Data

(60) Provisional application No. 61/019,892, filed on Jan. 9, 2008.

(51) Int. Cl.
*B64C 25/00* (2006.01)

(52) U.S. Cl. .................. 244/17.17; 206/335; 52/64

(58) Field of Classification Search .............. 244/17.17, 244/115, 116, 114 R, 110 R, 100 A, 1 R; 340/947; 701/16; 206/335
See application file for complete search history.

(56) References Cited

U.S. PATENT DOCUMENTS

| | | | |
|---|---|---|---|
| 3,013,747 A * | 12/1961 | Grihangne et al. ........ 244/17.17 |
| 3,818,652 A | 6/1974 | Pierce | |
| 3,823,519 A * | 7/1974 | Cordova ............................ 52/65 |
| 4,118,209 A | 10/1978 | Exler et al. | |
| 4,174,081 A * | 11/1979 | Sardanowsky ............. 244/17.17 |
| 4,236,854 A | 12/1980 | Rogers | |
| 4,255,911 A * | 3/1981 | Beacom et al. ..................... 52/66 |
| 5,119,935 A * | 6/1992 | Stump et al. .................. 206/335 |
| 5,179,968 A | 1/1993 | Deichmann | |
| D342,446 S * | 12/1993 | Parker et al. .................... D9/415 |
| 5,800,006 A * | 9/1998 | Pettigrew ................. 296/136.02 |
| 5,851,050 A | 12/1998 | Squire et al. | |
| 6,109,872 A | 8/2000 | McCausland | |
| 6,113,142 A | 9/2000 | Tolbert | |
| 6,715,711 B1 | 4/2004 | Muylaert et al. | |
| 6,749,151 B1 | 6/2004 | Ross | |
| 6,758,230 B2 | 7/2004 | Bogart, Jr. | |
| 6,835,045 B1 | 12/2004 | Barbee et al. | |
| 6,854,475 B2 | 2/2005 | Slabbert | |
| 7,131,610 B2 * | 11/2006 | Swadling ....................... 244/1 R |
| 2003/0192987 A1 | 10/2003 | Ahrendt et al. | |
| 2005/0001093 A1* | 1/2005 | Hayashi .................... 244/17.17 |
| 2005/0006197 A1 | 1/2005 | Wendell et al. | |

FOREIGN PATENT DOCUMENTS

| | | |
|---|---|---|
| GB | 2370548 A | 7/2002 |
| JP | 11293962 A | 10/1999 |

* cited by examiner

*Primary Examiner* — Christopher P Ellis
*Assistant Examiner* — Medhat Badawi
(74) *Attorney, Agent, or Firm* — Fox Rothschild LLP; Richard C. Woodbridge; Perry M. Fonseca

(57) ABSTRACT

A clamshell case for enclosing a helicopter includes a base for supporting said helicopter, a first side section attached by a first hinge to one edge of the base, a second side section attached by a second hinge to the other edge of the base, and a drive system for rotating said side sections towards each other to substantially enclose said helicopter and substantially completely protect it from the weather and other damage.

21 Claims, 18 Drawing Sheets

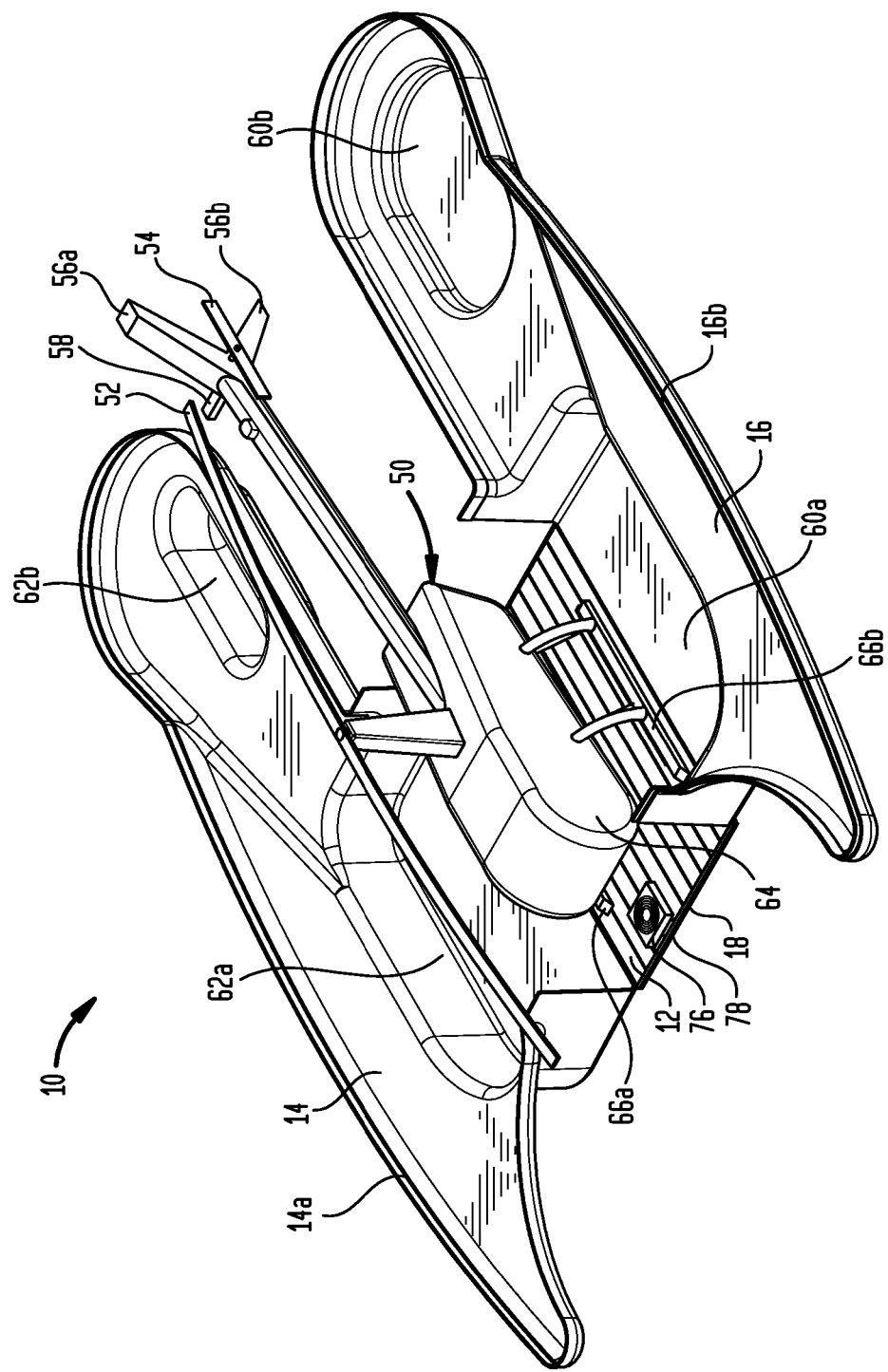

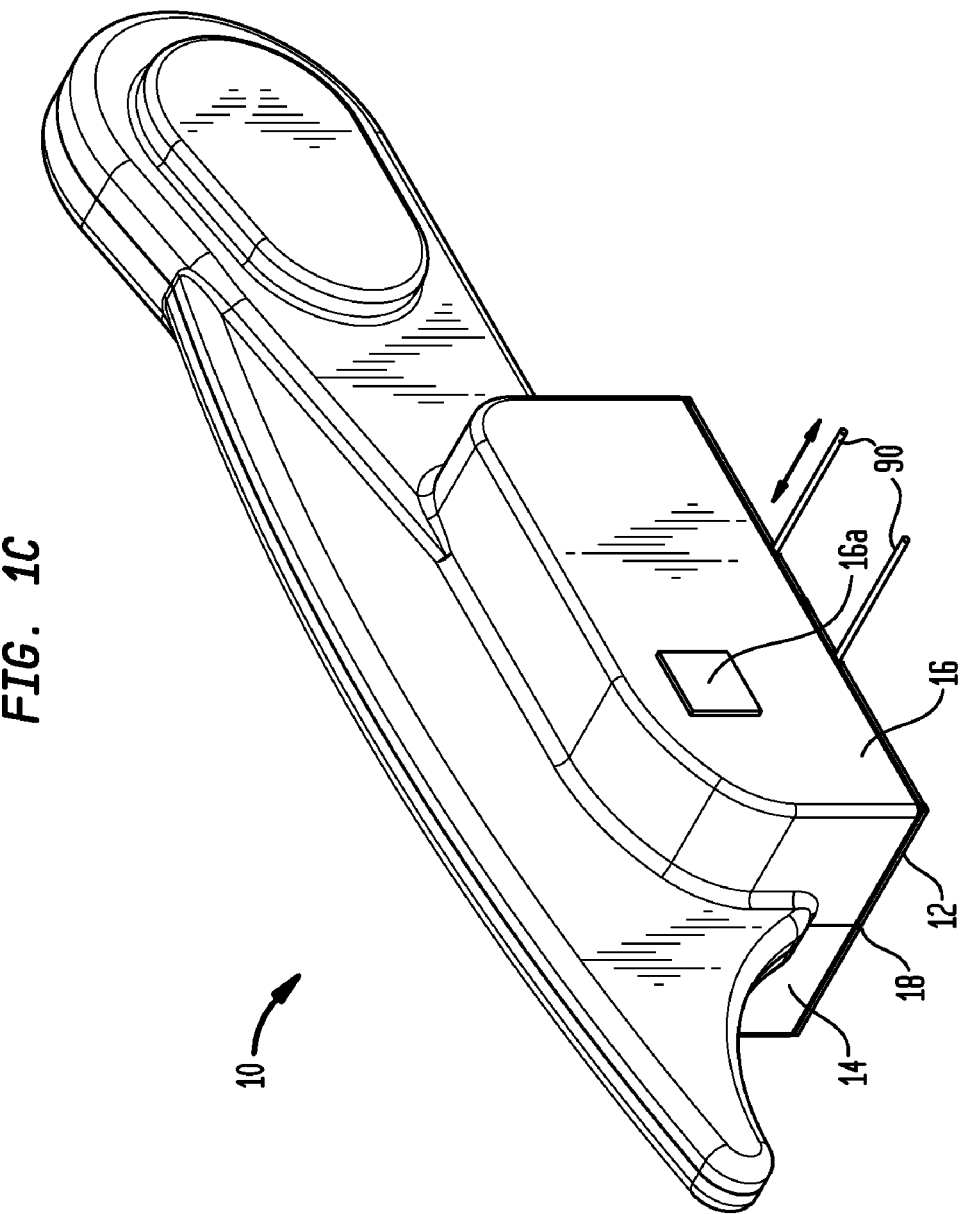

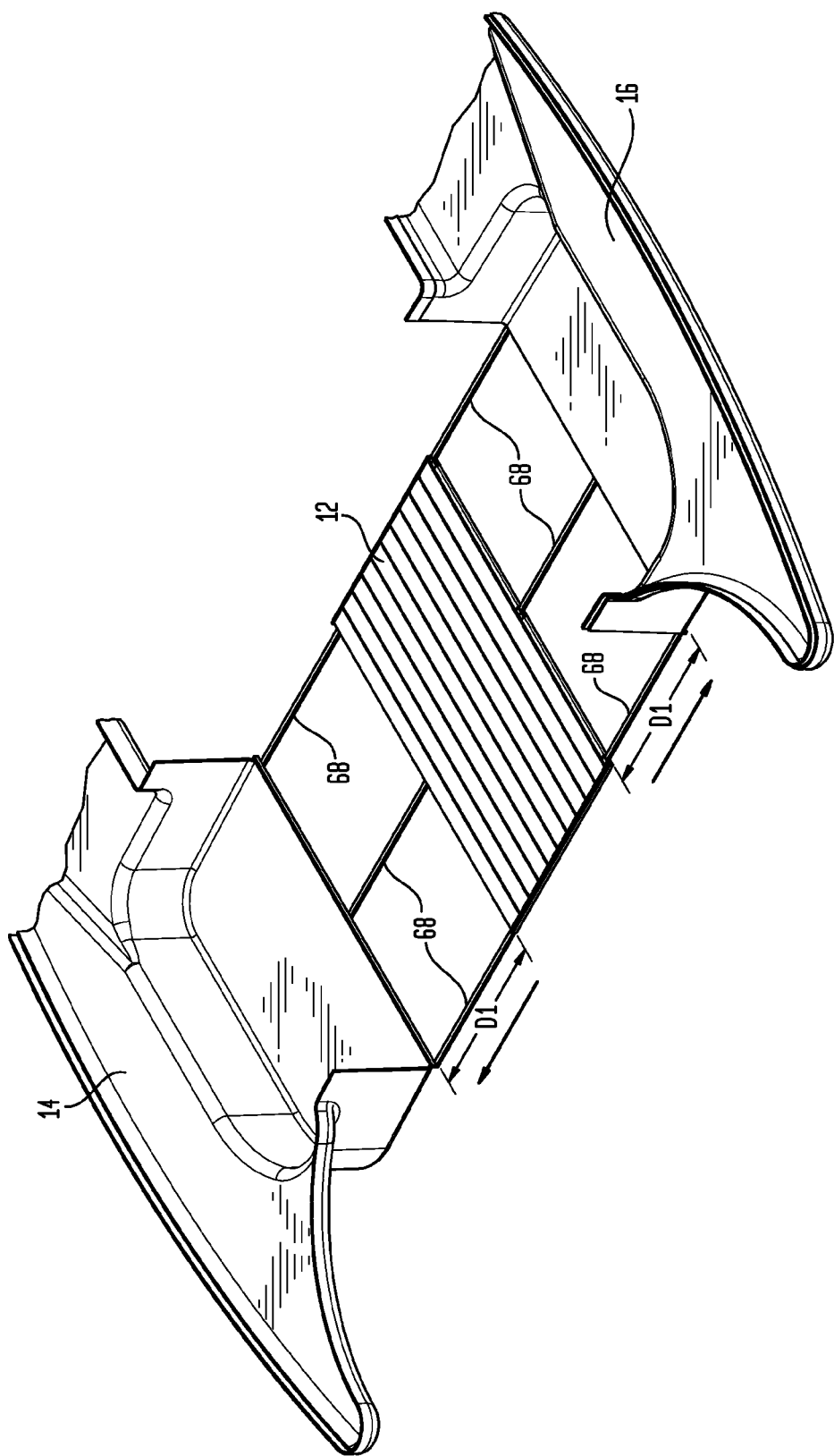

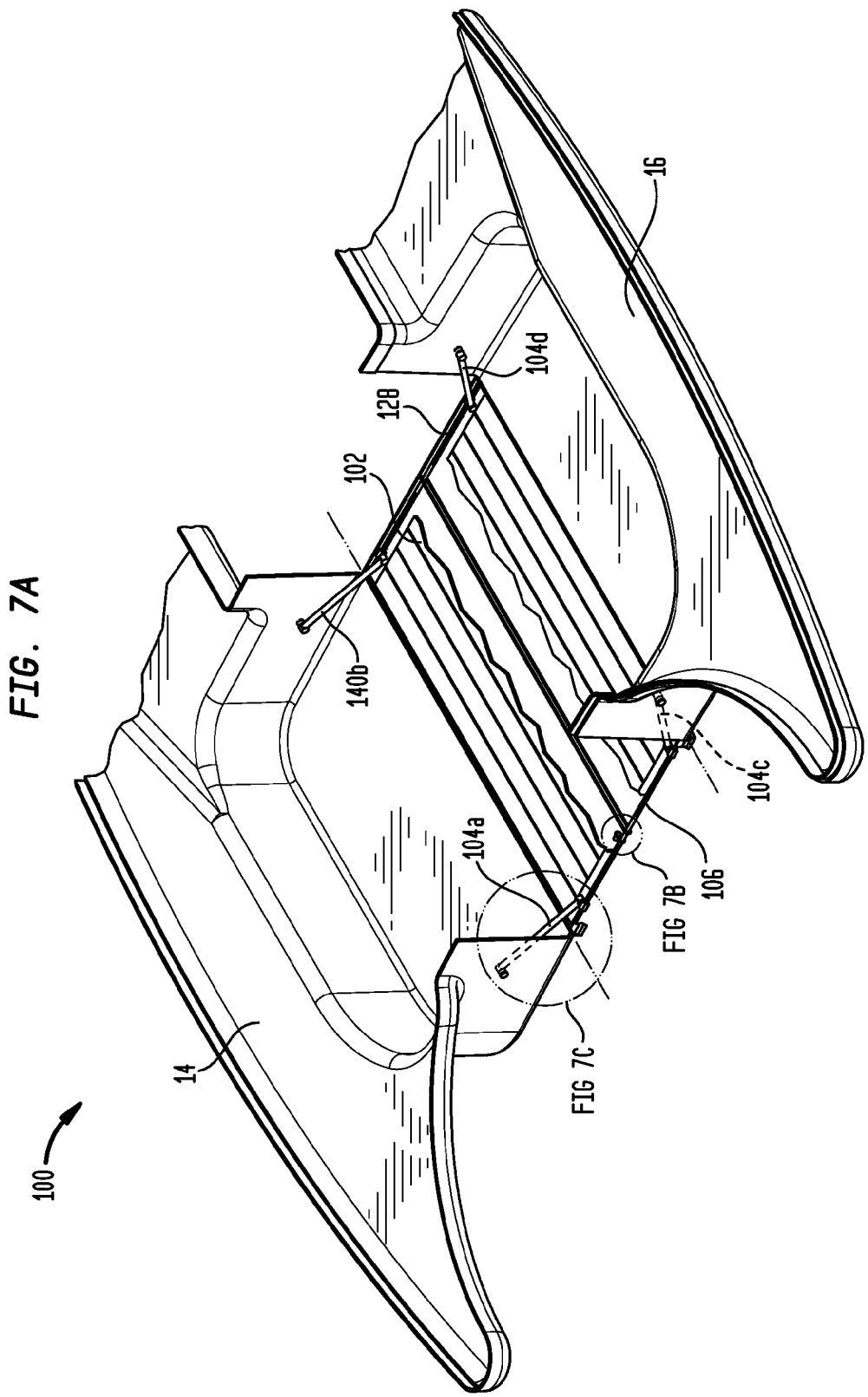

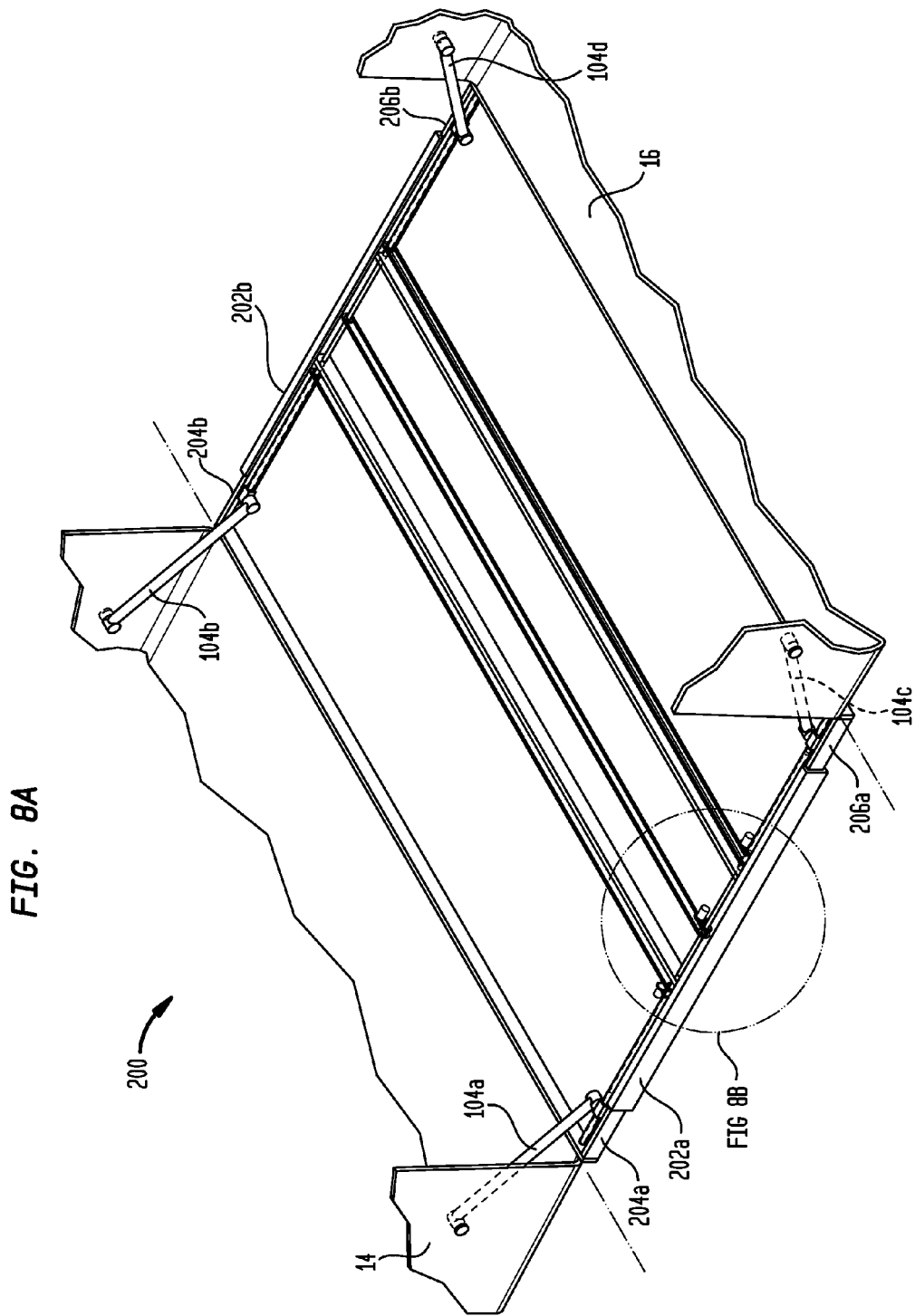

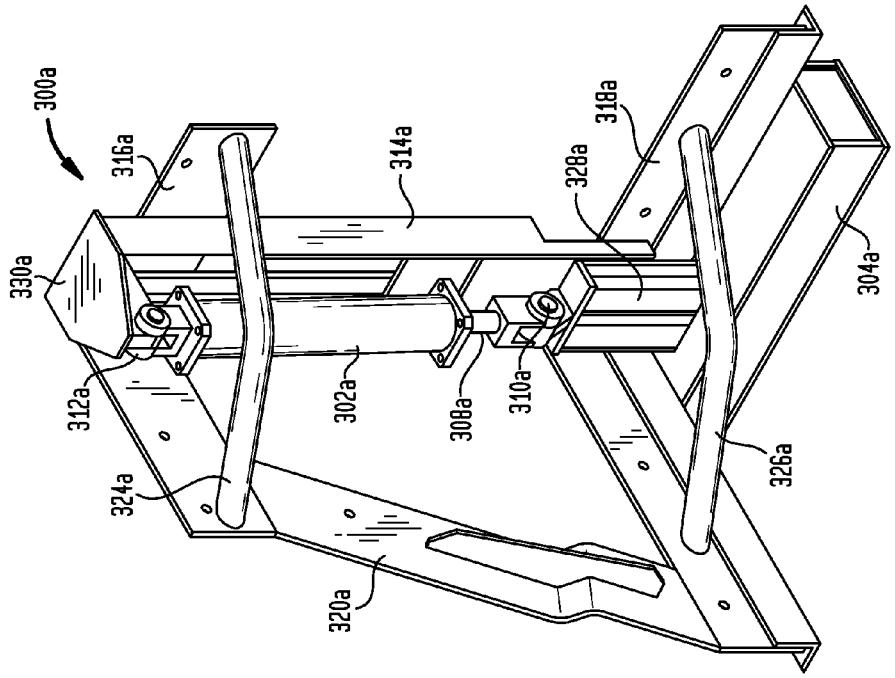
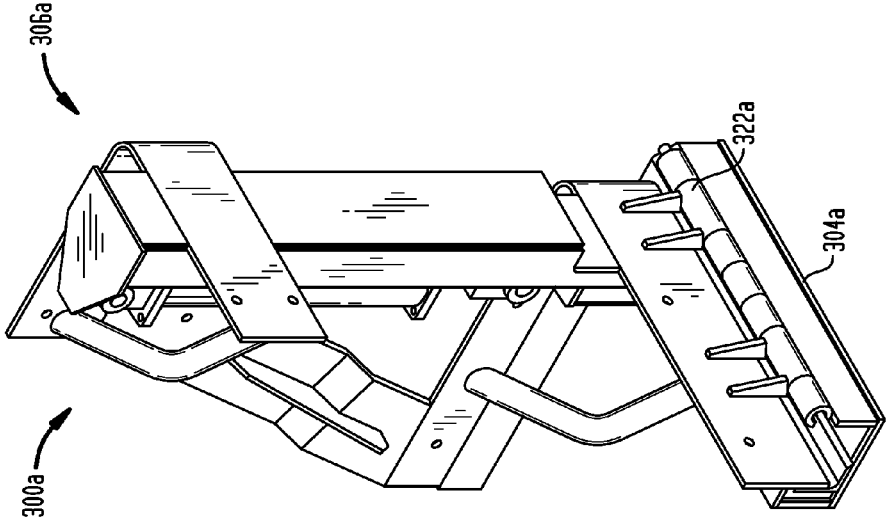

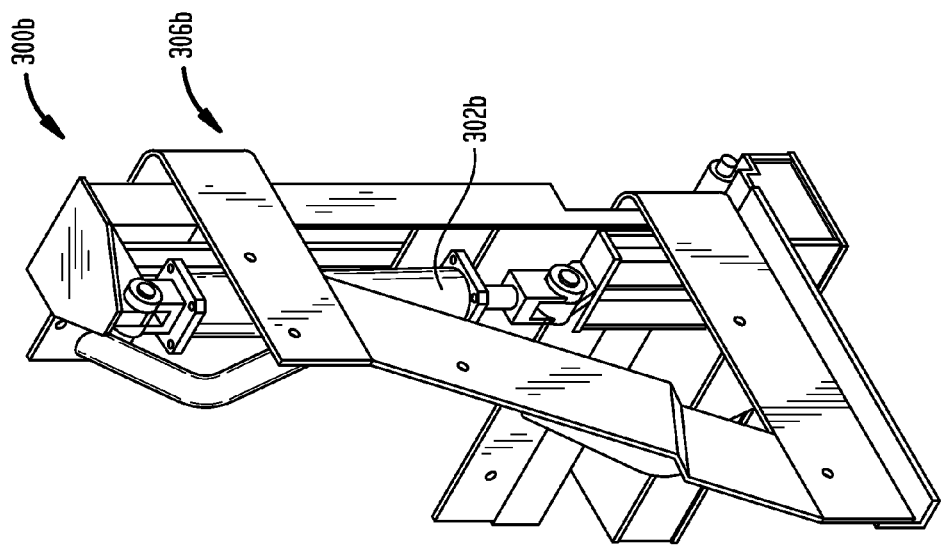
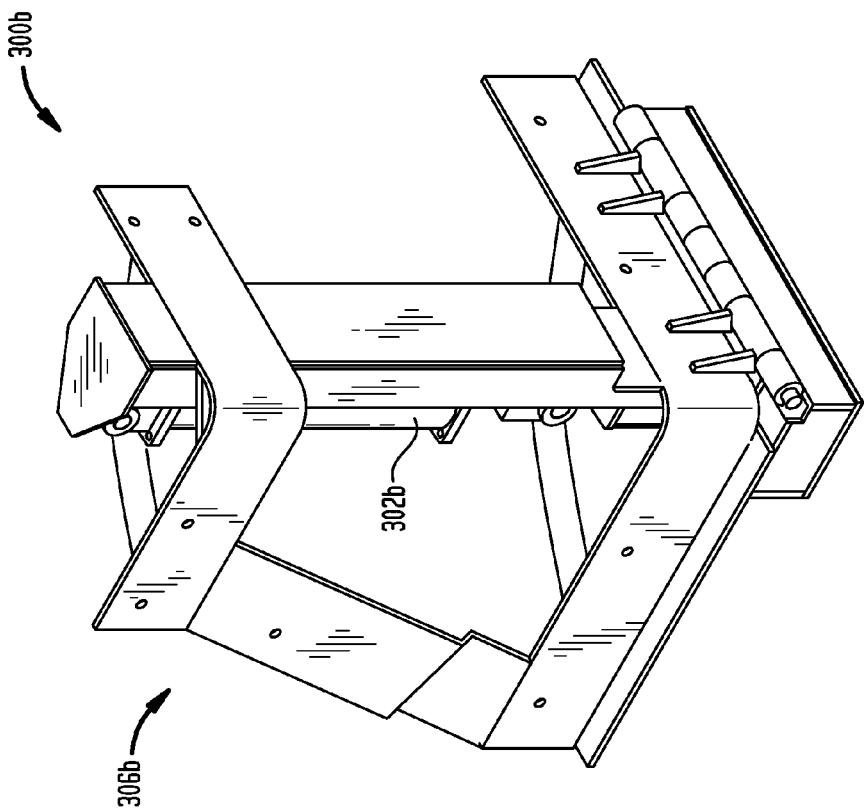

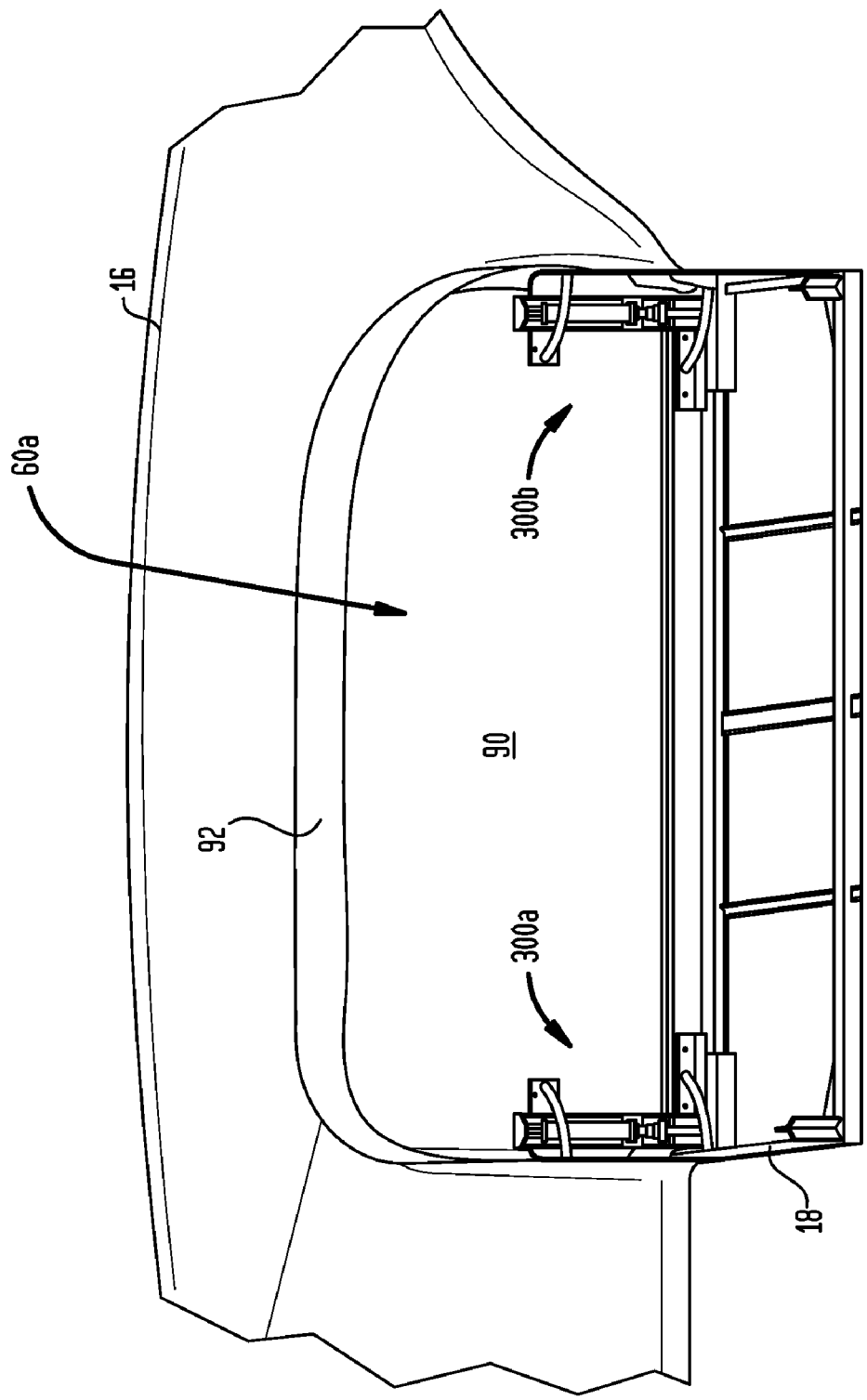

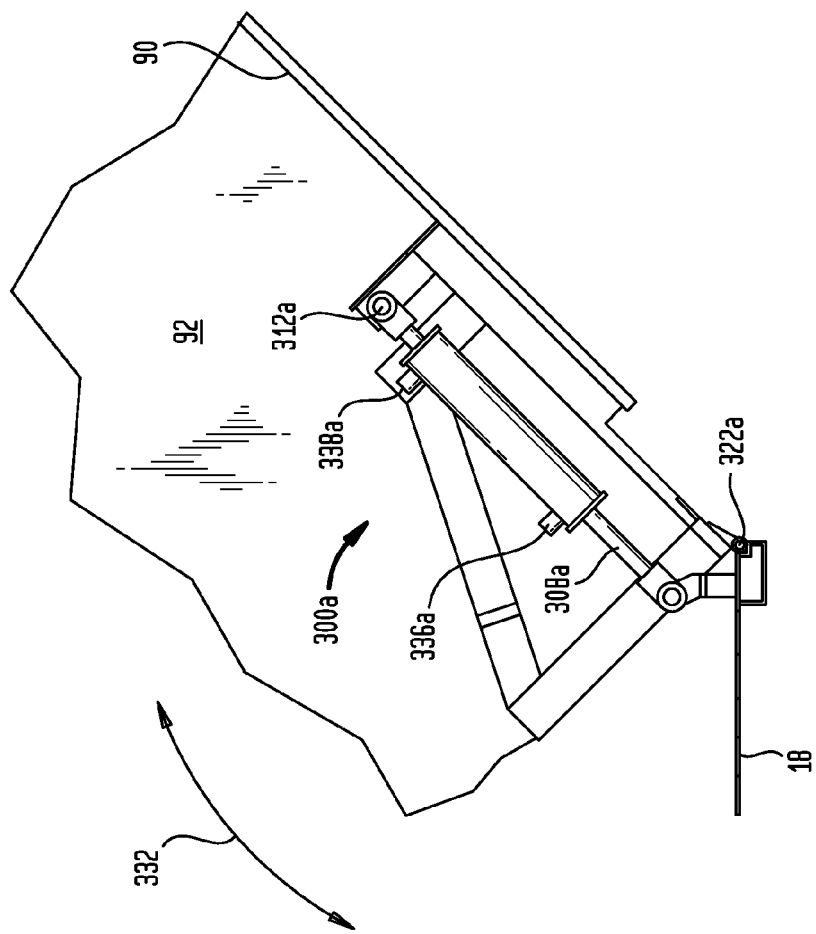
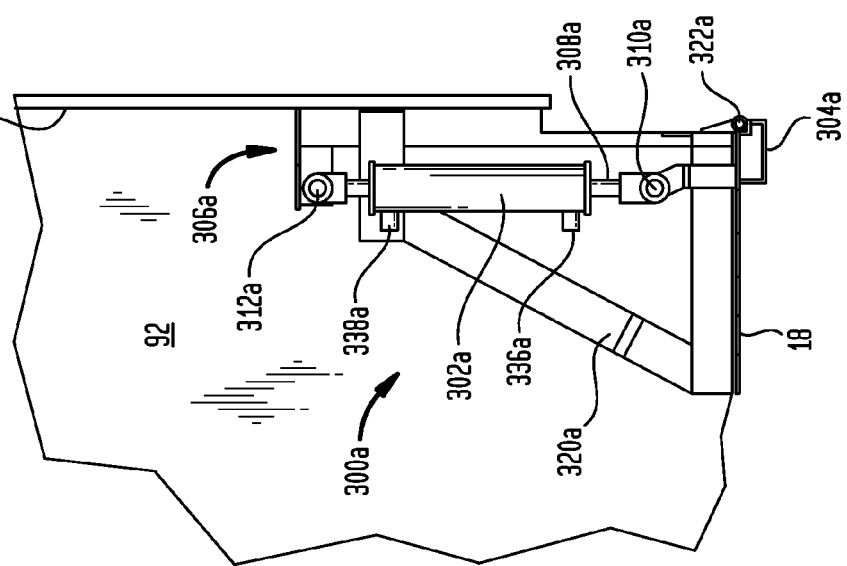

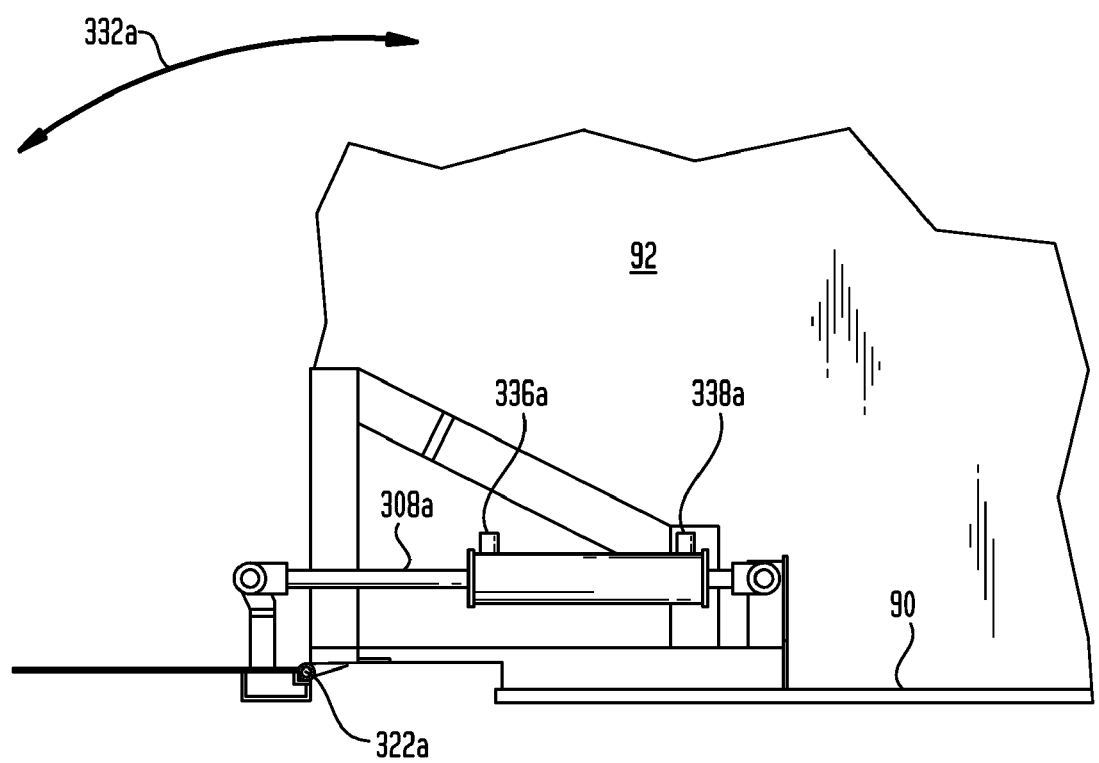

COMBINED HELICOPTER LANDING PAD AND CLAMSHELL ENCLOSURE

CROSS REFERENCE TO RELATED APPLICATIONS

This application is a 371 National Phase of PCT Application No. PCT/US2009/030595 filed on Jan. 9, 2009 entitled "Combined Helicopter Landing Pad and Clamshell Enclosure," and claims the priority of U.S. Provisional Patent application No. 61/019,892 filed on Jan. 9, 2008 by inventor Bernard Hanafin and entitled "Heli Hut Concept," the entire contents and substance of which is incorporated herein by reference.

FIELD OF INVENTION

This invention relates to a combined helicopter landing pad and clamshell enclosure invention that permits a helicopter to make a safe landing directly into the landing pad and subsequently secures the helicopter from elements, potential tampering and wildlife infestation.

DESCRIPTION OF RELATED ART

Historically, helicopters are landed and, where safe secure storage is desired, the helicopter is somehow moved (or towed or pushed) into a suitable hangar. Often, safe secure storage is desired but not available. In many situations, the landing zone is too small to accommodate a shelter, or perhaps shelters are already occupied, or perhaps the landing zone is too remote to accommodate a permanent structure.

In most cases, helicopter pilots and owners want to secure their aircraft from potential damage due to environmental conditions and/or tampering of any kind, including malicious, accidental or wildlife.

Prior art protective structures include flexible, sheet like canopies, which can be placed over or around key components of the helicopter. These systems usually consist of tent-like structures, often resting directly on the helicopter blades or fuselage and somehow attached thereto. In such cases large areas of the aircraft are left exposed to the elements, tampering, or wildlife. The following disclosures are typical of the current state of the art.

U.S. Pat. No. 3,823,519 describes a "Aircraft Hangar" that leaves the entire underside of the aircraft exposed to elements, tampering and critters. The embodiment described does not seal the aircraft in any way; it merely covers it with two minor image cover sections pivoting on a vertically mounted hinge at the tail of the aircraft. The aircraft cannot be flown into the hangar, nor is the propeller stored inside the structure, nor can the enclosed structure be moved without disassembling significant parts of the structure.

U.S. Pat. Nos. 5,179,968 and 6,749,151 disclose a portable hangar for helicopters. In both patents, a tent-like canopy is draped over the rotor blade and secured by ropes to the ground. Both patents are limited to helicopters with more than two rotor blades and both limit the climatic conditions which are protected to direct sunlight.

U.S. Pat. No. 6,854,475 likewise discloses a cover for protecting a helicopter or "parts thereof." The disclosure is limited to at least three bladed rotor helicopters. Similarly, the patent describes a cover that drapes on the helicopter and leaves substantial areas of the aircraft unprotected from environmental conditions.

U.S. Pat. No. 7,131,610 and application publication No. 2005/006197 describe a cover suspended above the rotors yet similarly require at least three rotors and does not enclose the helicopter in any way, hence the element of sunlight is the only protection.

U.S. Pat. No. 4,255,911 describes yet another prior art helicopter enclosure. While the invention described in that disclosure has some similarities to the current invention, in practice the device isn't practical. In order to get any mechanical leverage the drive cylinders have to intrude substantially into the landing area thereby reducing the landing zone and presenting a landing hazard. More importantly, the power required to open and close the housing sections is very significant and would put significant stresses on the structure rapidly leading to fatigue and structural failure.

The following patent and disclosure describe other aircraft protective devices of possible, but probably lesser, relevance: U.S. Pat. Nos. 3,270,755; 3,818,652; 5,800,006; 6,109,872; 6,113,142; 6,715,711; 6,758,230; 6,835,045; U.S. Design Pat. No. D342,446; UK Patent No. 2,370,548; and Japanese Patent No. JP 11293962.

In none of the above prior art inventions is the pilot able to land directly onto the shelter. In contrast the present invention permits an experienced pilot to set down onto the shelter without subsequently moving the aircraft. The advantage here is significant when one is landing in space-limited areas such as heliports, decks, pinnacles, yachts, ships, rooftops or other confined spaces. When one considers that a principal advantage of helicopter flight is the ability to land in confined spaces, the unique advantage of a storage case which permits safe easy protection in confined spaces and/or "off airport" locations becomes clear.

None of the prior art permits the shipping of a helicopter in the same case as the aircraft can land onto. By using the present invention, a helicopter owner can safely ship the aircraft around the world using any means of transport and rest assured that the aircraft is safely cocooned inside.

It was in the context of the foregoing prior art challenges that the present invention arose.

SUMMARY OF THE INVENTION

Briefly described, the invention comprises a steel framed deck or base with wood or other suitable planking material on which a helicopter can land. On each side of the deck is a helicopter shaped, shell-like structure comprised of fiberglass or other rigid material. Each shell is in the rough shape of the helicopter, one shell approximating the port side and the other shell approximating the starboard side of the helicopter.

Once a pilot has landed and stopped rotor rotation on the deck, the pilot aligns the blades along the longitudinal axis of the helicopter (a standard practice) and secures same using the helicopter's rotor brake or other rotor strap. The pilot exits the helicopter and activates the mechanism to raise the two shells into a vertical position thus completely encapsulating the helicopter.

The pilot can now leave the area assured that the helicopter is secure from elements, potential tampering or wildlife infestation. As the pilot chooses, the entire closed assembly can be wheeled into a hangar, or a trailer, or left secured to the ground where the landing took place. The invention may be more fully understood by reference to the following drawings.

BRIEF DESCRIPTION OF THE DRAWINGS

FIG. 1A is a perspective view of the preferred embodiment of the combined helicopter landing pad and clamshell enclosure invention shown in the fully opened.

FIG. 1C is a perspective view of the preferred embodiment shown in FIGS. 1A and 1B in the fully closed state.

FIG. 6B is a front perspective view of the alternative embodiment of the invention shown in FIG. 6A in which the landing pad base is expanded to make a larger target for a helicopter to land on.

FIG. 7A is a front perspective view of an alternative embodiment of the invention in which the drive mechanism comprises an electric motor and the enclosure is shown in the open position.

FIG. 8A is a front perspective view of an alternative embodiment of the invention in which the drive mechanism comprises an electric motor and the landing pad base is expandable.

FIG. 9A is a side elevation view of a first hydraulic cylinder and cage combination.

FIG. 9B is a side elevation view of the first hydraulic cylinder and cage combination shown in FIG. 9A rotated 90°.

FIG. 10A is a side elevation view of a second hydraulic cylinder and cage combination.

FIG. 10B is a side elevation view of the second hydraulic cylinder and cage combination shown in FIG. 10A rotated 90°.

FIG. 11 is a partial side elevation view showing the first and second hydraulic cylinder and cage combinations mounted inside the clamshell housing.

FIG. 12A is a partial, cross sectional view of the first hydraulic cylinder and cage combination shown in the closed position.

FIG. 12B illustrates the clamshell housing in the partially open position with the piston rod partially extended.

FIG. 12C illustrates the clamshell housing in its fully open position with the piston rod fully extended.

DETAILED DESCRIPTION OF THE PREFERRED EMBODIMENT

Figure 1B:
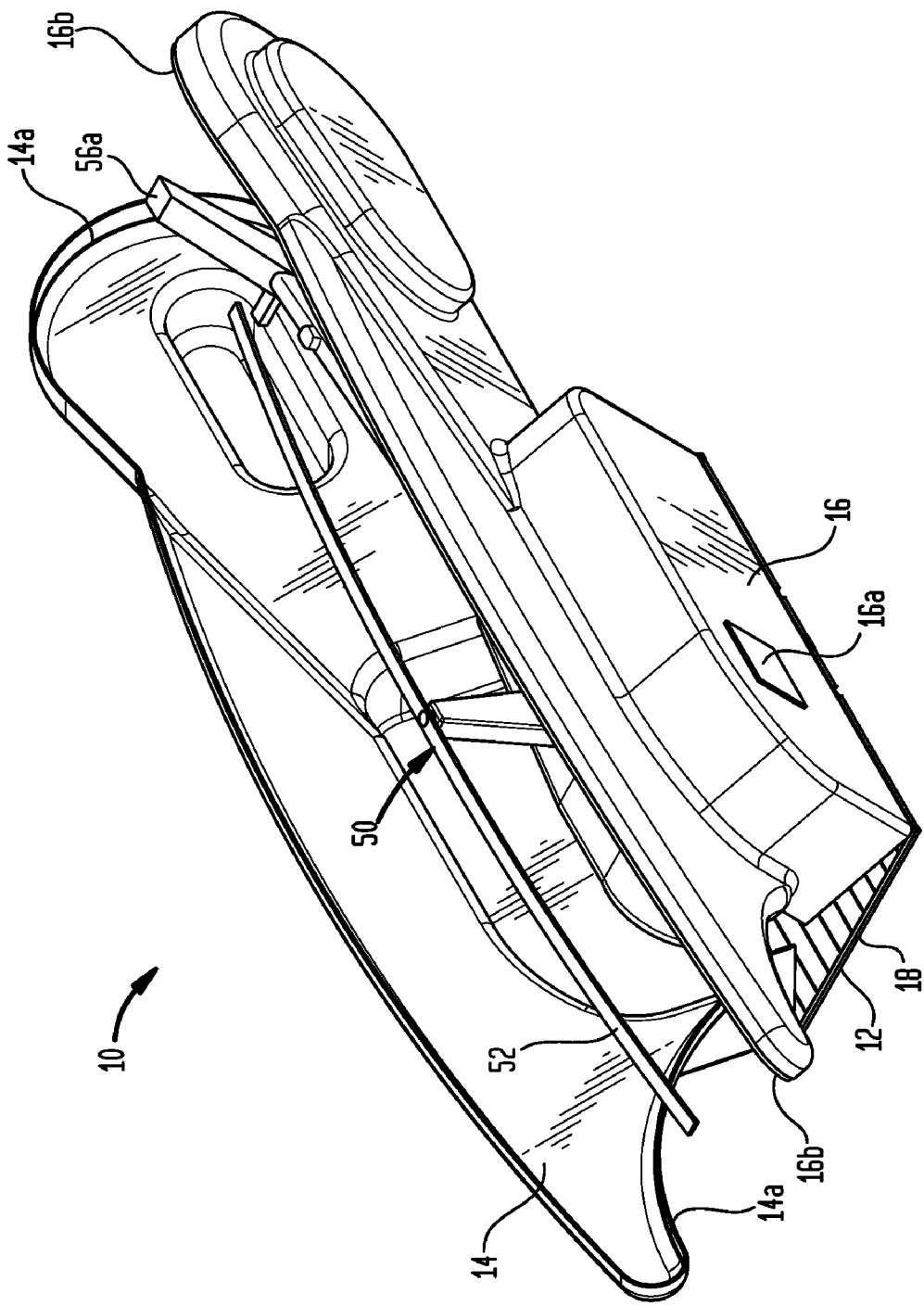
FIG. 1B is a perspective view of the preferred embodiment shown in FIG. 1A above in an almost closed state.

During the course of this description like numbers will be used to identify like elements according to the views that illustrate the invention:

The preferred embodiment of the helicopter enclosure invention 10 shown in FIGS. 1A-5B begins with a bed frame-like base 12. The steel or heavy base 12 is rectangular shaped. It is preferably longer than the skids 66a and 66b of a helicopter 50. A typical helicopter 50 includes a cabin 64 which rests on a left and right set of skids 66a and 66b. The other main features of the helicopter 50 include a main rotor blade 52, a rear rotor blade 54, a vertical tail fin rudder 56a and an elevator tab 56b and lower fin 58.

Base 12 is preferably "filled-in" by laying planks across the frame. The planks can be of any solid material, wood being the easiest and most economical. The base 12 can use any material substantial enough to support the weight of the helicopter 50. Wood is preferred because of its economy and simplicity. Whatever material is used, it is essential that the material support the weight of the helicopter 50 and preferable that it allow the user to easily remove sections and drill or penetrate through the material in the event the user wishes to add electricity, water or other services to the storage unit.

Figure 6A:
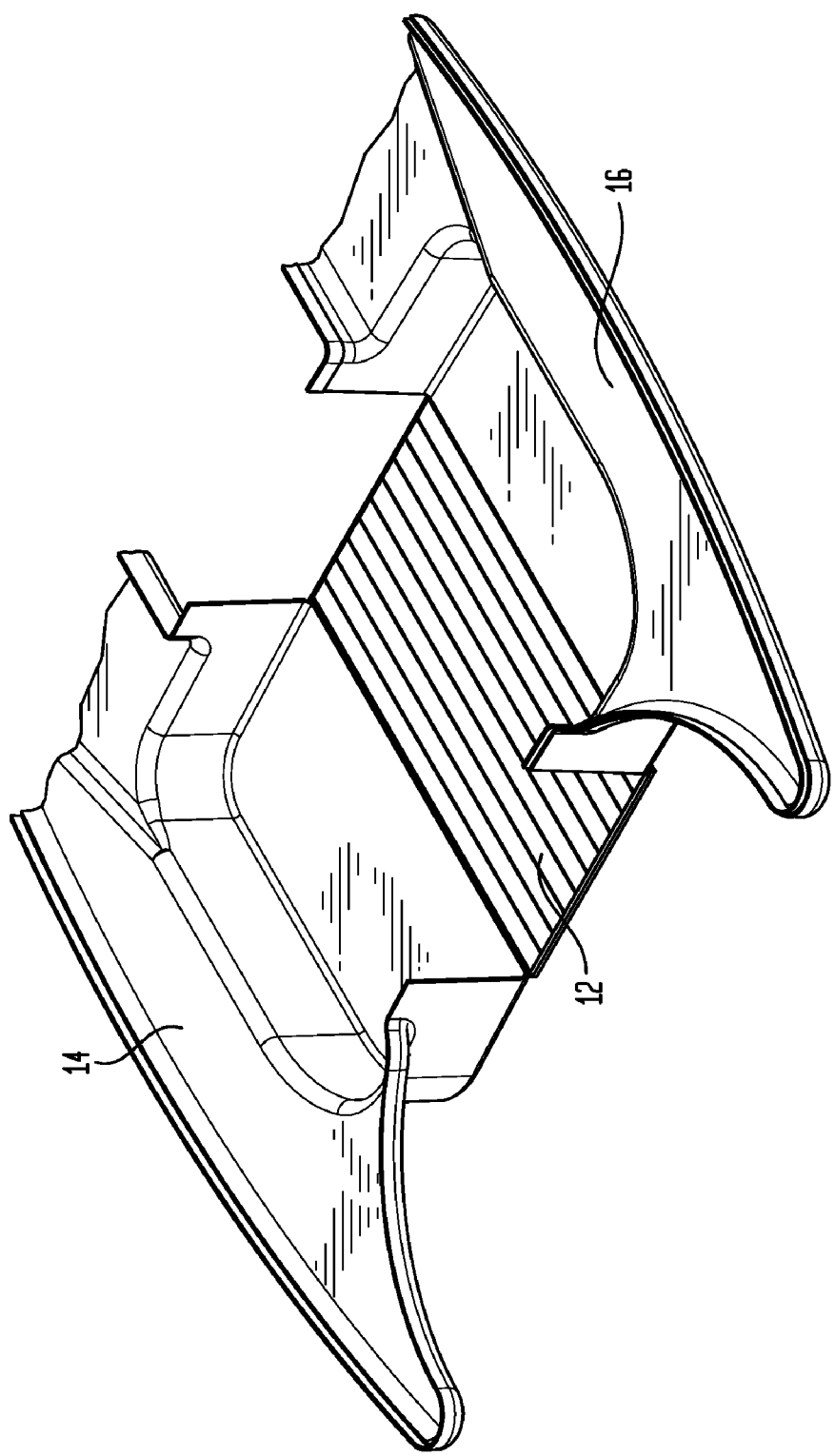
FIG. 6A is a front perspective view of an alternative embodiment of the invention in which the landing pad base is expandable and where the base is shown in its collapsed state.

The base 12 can be made expandable by incorporating a plurality of pull out, drawer-like rails 68 on each of side of the base 12 as shown in FIGS. 6A and 6B. FIG. 6a shows the base 12 in its collapsed state and FIG. 6b shows the base in its expanded state. In the extended state shown in FIG. 6B the base is shown having an additional length of D1 on either side of the base 12. D1 can be of the order of 12" to 36" or more.

In either the fixed or the expandable version, a fiberglass shell 14 and 16 resembling the shape of the helicopter 50 is attached via hinge pivot rods 72a and 72b to each of the two the outer longitudinal frame members. Left cabin, or port, shell 16 includes a first pocket 60a that surrounds half of the helicopter cabin 64 and second pocket 60b that surrounds and protects the tail rotor 54 and left rear elevator tab 58a. Similarly, right side, or starboard, clamshell section 14 includes a first pocket 62a that surrounds the half of the cabin 64 not covered by pocket 60a and a second pocket 62b that encloses and protects the right side rear elevator tab 58b when sections are in the closed position shown in FIG. 1C. The right, or port, shell 14 includes a female seal 14a along its edge that mates with a male seal 16a along the edge of the edge of the right, or starboard, side shell 16 when the clamshell apparatus 10 is closed. An optional, removable clear or opaque port window 16a shown in FIG. 1C allows the user to look into the enclosure 10 and make sure all is safe and secure. If necessary the window 16a can be removed and inspections performed on the helicopter 50 from outside of the enclosure.

The enclosure operates in the following manner. The shells 14, 16 are able to swing up to meet each other, centered over the helicopter 50 and fully encapsulate same, as shown in FIG. 1C. The shells 14, 16 can also swing down to allow the helicopter 50 sufficient area to take off as shown in FIG. 1A. FIG. 1B shows the invention 10 in an intermediate position where the clamshell sections 14 and 16 are about 70% closed. The mechanism preferably automatically stops in this position so that last minute adjustments can be made to the rotors 52 and 54 so that they are aligned parallel to the long axis of the clamshells sections 14 and 16 when the case fully encloses the helicopter 50. This intermediate position helps to avoid potential damage caused by improper positioning prior to closing to helicopter 50 during the closing operation.

Figure 2A:
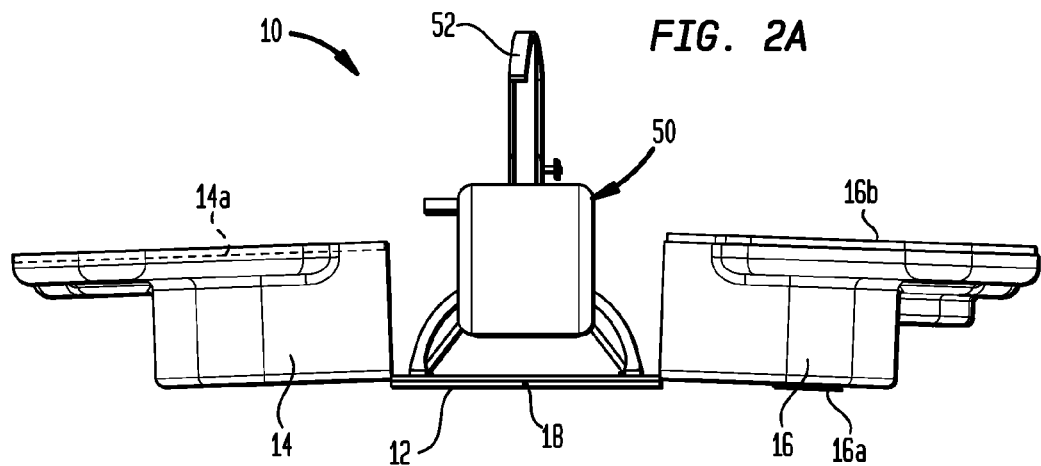
FIG. 2A is a front view of the preferred embodiment shown in FIG. 1A fully opened.
Figure 2B:
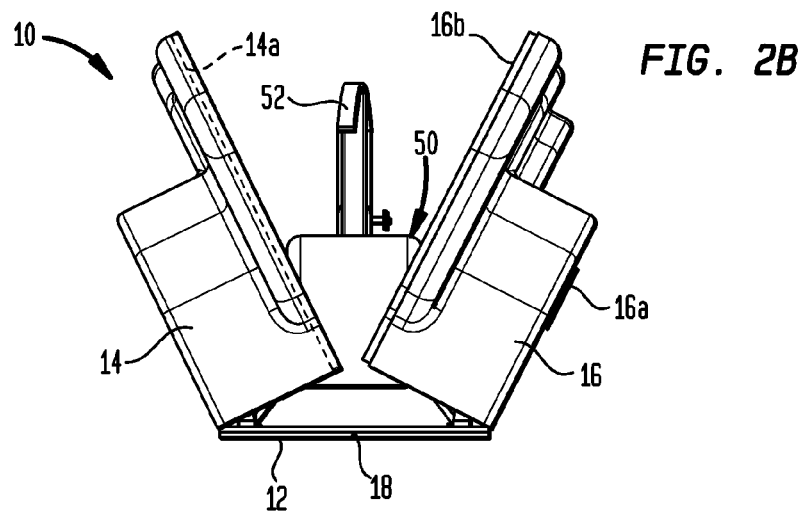
FIG. 2B is a front view of the preferred embodiment shown in FIG. 1B in an almost closed state.
Figure 2C:
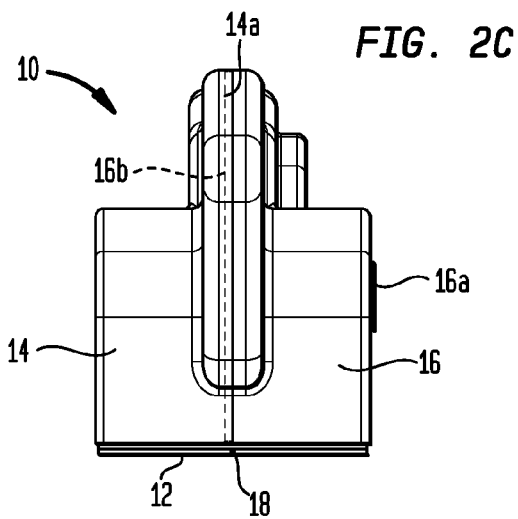
FIG. 2C is a front view of the preferred embodiment shown in FIG. 1C in the fully closed state.

FIGS. 2A-2C are front vertical elevational views of the clamshell enclosure moving from the fully open to the fully closed position and paralleling the perspective views of FIGS. 1A-1C, respectively.

Alternative embodiments of the invention 10 might allow the clamshell sections 14 and 16 to rotate beyond 90 degrees downwardly to give the pilot more room to step out of the aircraft and provide clearance for landing purposes.

The preferred embodiment of the hydraulic mechanism 20 for opening and closing the shell sections 14 and 16 is shown in FIGS. 3-5B.

Figure 3:
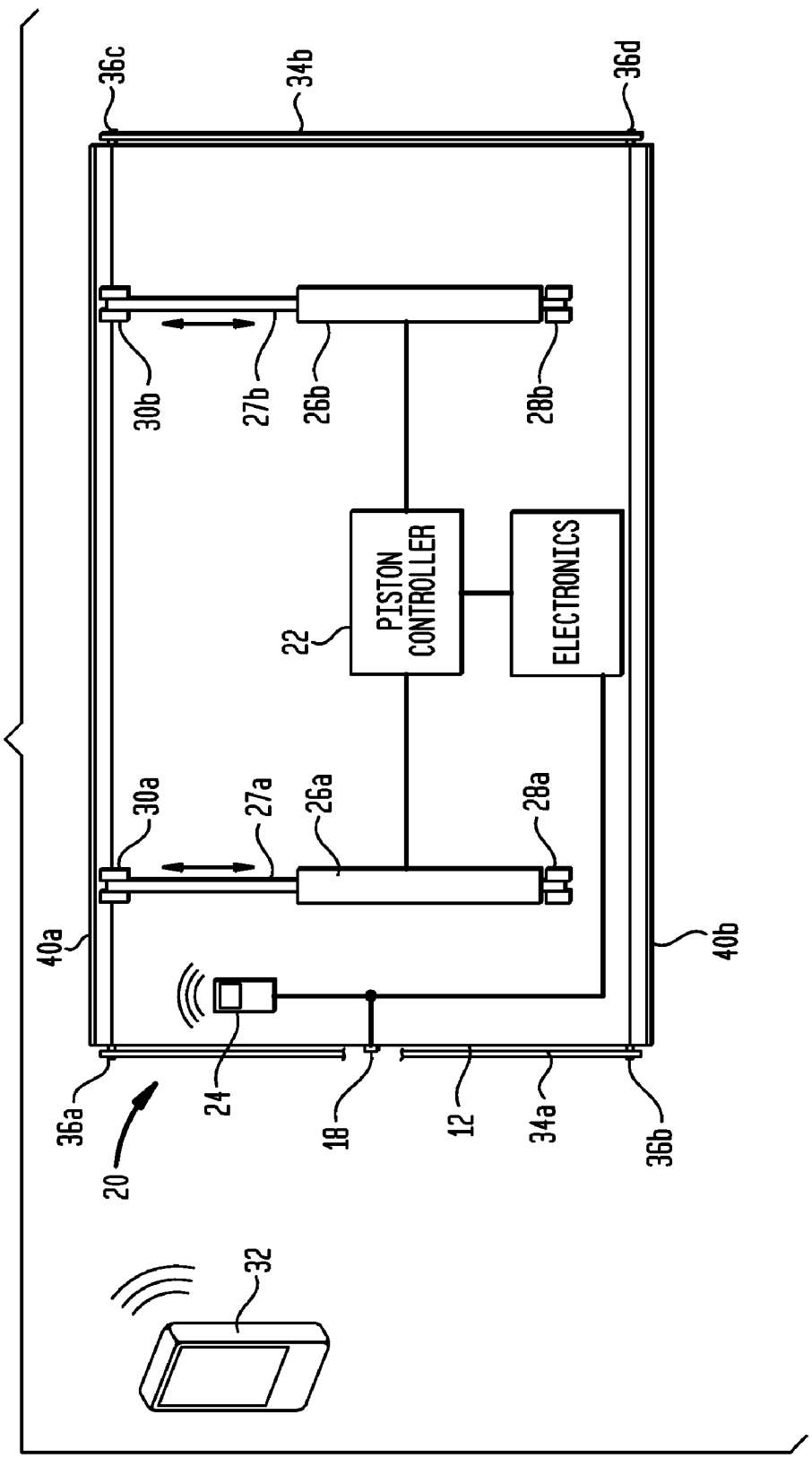
FIG. 3 is a top view of the platform (looking through the base) schematically showing the hydraulic drive mechanism including the electronic controls connected to the drive pistons, a manual control button and a remote control transceiver.
Figure 4A:
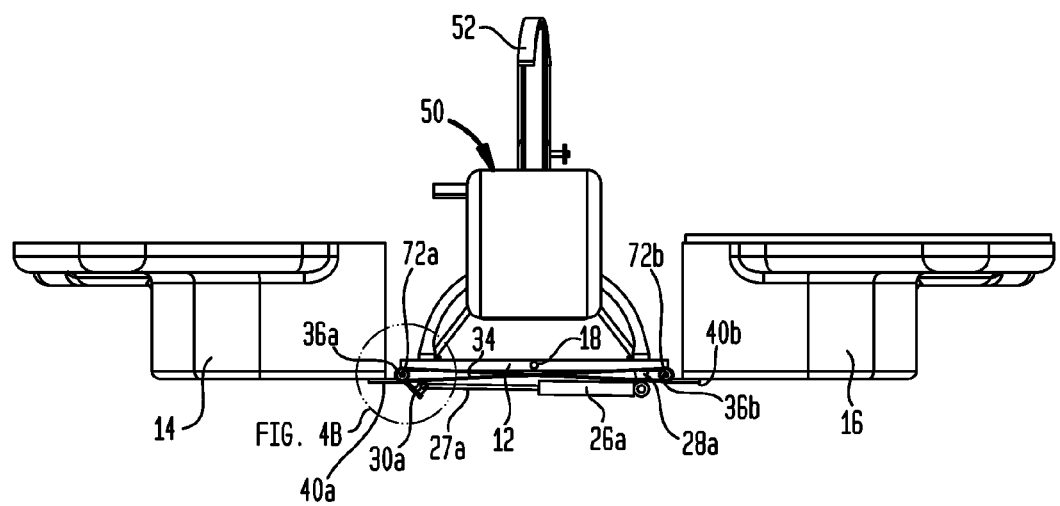
FIG. 4A is a front view of the device showing the hydraulic system and gear and chain mechanism with the clam shell case in the fully opened position.
Figure 4B:
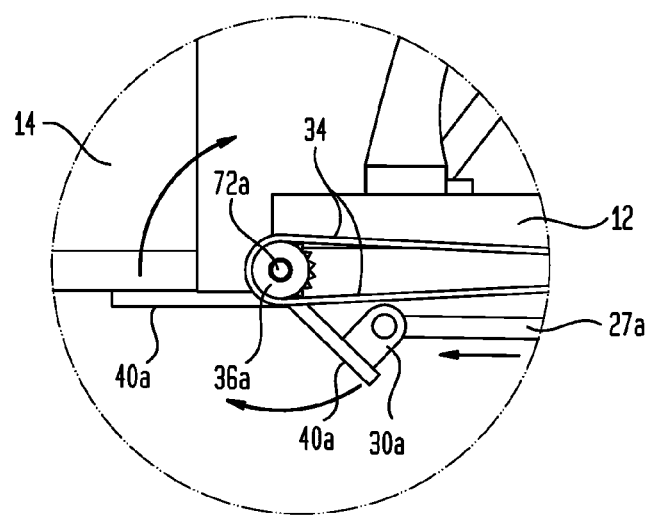
FIG. 4B is an enlarged, detail view of one of the gear and chain mechanism and angle piece that supports the shell and is attached to the piston rod with the clamshell case or enclosure shown in the fully opened position.

FIG. 3 is a top schematic view of the hydraulic mechanism 20 shown mounted on the platform 12, looking through the base 12. A piston controller 22 controls the operations of a pair of piston 26a and 26b. Front and rear pistons 26a and 26b drive front and read piston rods 27a and 27b which are respectively attached to front and rear pivotable attachment tab means 30a and 30b. Tabs 30a and 30b are attached to the lower portion of right angle member 40a and causes the angle member 40a to rotate under the influence of pistons 26a and 26b. The upper portion of the right angle member 40a is attached to the bottom portion of the right clamshell section 14 so that actuation of pistons 26a and 26b by controller 22 causes the clamshell section 14 to rotate between the three positions illustrated in FIGS. 1A-2C. Piston controller 22 is controlled by a common hydraulic electronic package 74 which, in turn, is activated by a transceiver 24 which can be actuated by a remote switch 32. A transceiver 24 and a remote control switch 32 which are suitable for such a purpose are available from Inmotion Controls, Inc., 1914 Silver Street, Garland, Tex. 75042 and identified as Model No 140 Series Radio/Remote Control. There are acceptable remote control transceivers and controllers available from other manufacturers too. Alternatively, the apparatus 10 can be controlled by a button 18 attached to the front or rear of the base 12. FIG. 4B shows in detail how the outward movement of rod 27a causes the angle 40a and clamshell section 14 to rotate in the direction of the arrows shown.

A pair of gears 36a and 36c are rigidly attached at opposite ends of angle piece 40a and rotate as angle piece 40a rotates under the influence of hydraulic pistons 26a and 26b. As better seen in FIG. 4A, the teeth of gear 36a engage a chain 34a looped in the shape of a Figure Eight which in turn engages the teeth of gear 36b, which is attached to left angle piece 40b located on the opposite side of the base 12 from angle piece 40a. Similarly, the teeth of gear 36c engage the teeth of a second chain 34b attached to the opposite side of angle piece 40b from first chain 34a.

In operation, the combined landing pad and helicopter case apparatus could start in the fully opened position as shown in FIGS. 1A, 2A, 4A and 4B. When the button 18 or the remote control switch 32 is activated a signal is sent to the electronic package 74 which causes the piston controller 22 to activate the pistons 26a and 26b. Piston rods 27a and 27b in turn move outwardly together putting pressure on tabs 30a and 30b which cause the angle piece 40a and gear 36a to move counterclockwise in the direction of the arrows in FIG. 4B. This causes the clamshell section 14 to move from the fully closed position towards the closed position. At the same time, the gears 36a and 36c rotate and drive chains 34a and 34b respectively which cause gears 36b and 36d to rotate in the opposite direction thereby also driving the other clamshell 16 from fully closed position towards the closed position.

About 70% of the way between the fully open position and the fully closed position the two clamshell sections 14 and 16 automatically stop in an intermediate position shown in FIGS. 1B and 2B. This functionality is built into the software or firmware in the electronics in a manner known to those of ordinary skill in the art. This can be accomplished by a timer or a sensor or a variety of different ways. The intermediate position allows the pilot or user to adjust the rotors 52 and 54 and other parts of the aircraft so that they don't get damaged during the closing operation. It also gives the pilot the opportunity to determine if foreign matter or arms or limbs will get caught as the case 10 is closed.

Figure 5A:
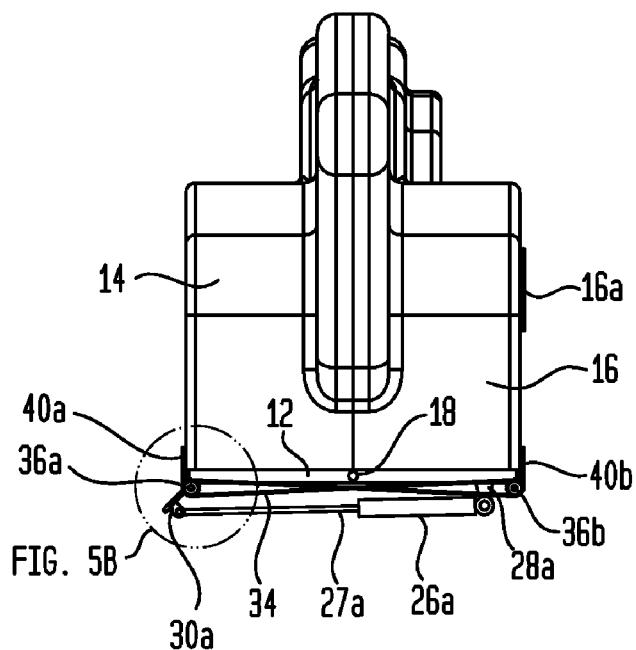
FIG. 5A is a front view of the device showing the hydraulics system and gear and chain mechanism with the shell shown in the fully closed position.
Figure 5B:
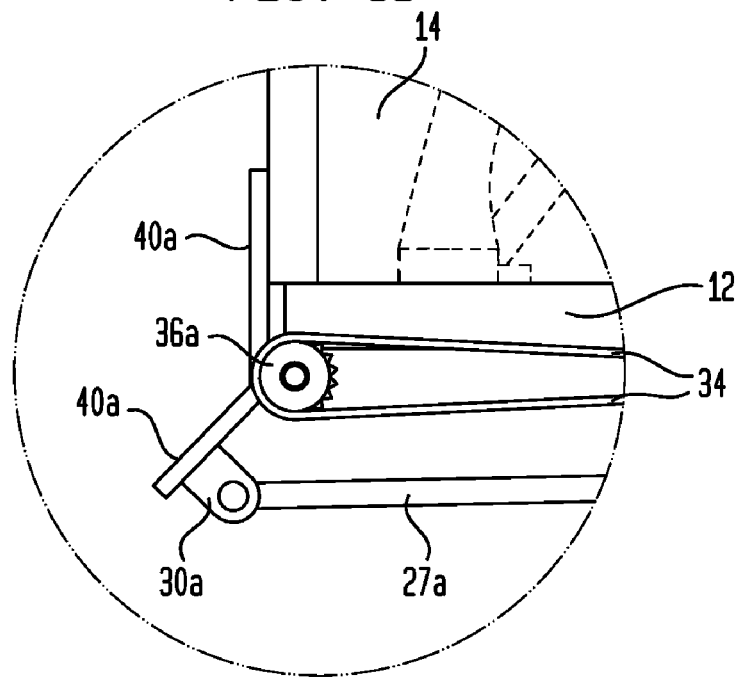
FIG. 5B is an enlarged, detail view of one of the gear and chain mechanisms and angle that supports the shell and is attached to the piston rod with the clamshell case shown in the fully closed position.

After the pilot or user makes his or her final aircraft adjustments with the apparatus in the intermediate position as described above, he or she pushes button 18 or remote control 32 one more time and the sections 14 and 16 come to the fully closed position as shown in FIGS. 1C, 2C and 5A. At this point the female portion 14a of side section 14 engages with the male portion 16b of the opposite clamshell side section 16 forming a weather tight seal. An optional physical lock (not shown) can be added to the female and male sections 14a and 16b if extra security is desired.

To open the clamshell apparatus 10 the process is simply reversed. The pilot or user pushes button 18 or remote control 32 and the two sections 14 and 16 move from the fully closed position shown in FIGS. 1C, 2C and 5A to the fully open position shown in FIGS. 1A, 2A and 4A. It is not necessary for the clamshell device to stop in an intermediate position as shown in FIGS. 1B and 2B when the apparatus is opened.

Fiberglass is the preferred material for the shell sections 14 and 16 because it is relatively strong and inexpensive, and it can be easily and economically molded to match the unique shape of each model helicopter 50. Alternative materials include wood, light metal, aluminum, plastic and combinations of these materials.

There are several alternative embodiments of the invention that can be useful. For example, the case 10 can be equipped with commercial climate control devices (76, 78) (e.g., a heater, a dehumidifier, etc.) to further insulate or alter the environmental conditions during storage or transport as shown in FIG. 1A. In addition, the case 10 can be fitted with wheels to allow ground handling of the case 10 as a unit, both with and without a helicopter 50. Moreover, the case 10 can be fitted with a nose pin as used on many helicopters to facilitate ground handling.

According to another embodiment, when the helicopter 50 is on the base or deck 12 its position can be made adjustable to ensure that the shells 14 and 16 do not contact the helicopter 50 at any point. Adjustment can be made using four adjustable bearings that are manually or mechanically levered up from the platform 12. The bearings should be of sufficient length to contact the helicopter skids 66a and 66b, allowing the user to push or pull the helicopter 50 to adjust its position. If preferred, the user can fly the helicopter 50 into a preferred position.

The use of a hydraulic mechanism 20 to open and close the shells 14 and 16 has the advantage of simplicity and security. It is essential that the shells 14 and 16 not slam closed before the helicopter 50 is properly positioned. It is also essential that the shells 14 and 16 not raise uncommanded. The downwash from a helicopter 50 could potentially raise the shells 14 and 16 unless the shells 14 and 16 are properly secured in the down position. Hydraulics assures that the shells can only raise when properly activated. While the drive mechanism 20 according to the preferred embodiment of the invention is hydraulic, it is also possible to use other drive mechanisms such as pneumatic pistons or electric drive motors.

Another alternative embodiment incorporates outriggers (90) as shown in FIG. 1C in the base 12 to prevent inadvertent lifting of the shells 14 and 16. These outriggers would slide out prior to opening the shells 14 and 16. The user would hook the end of the outrigger to the side of the shells 14 and 16, thus preventing the shell 14 and 16 from lifting. By using hydraulics, these outriggers are probably not necessary but could be added for extra security.

Figure 7B:
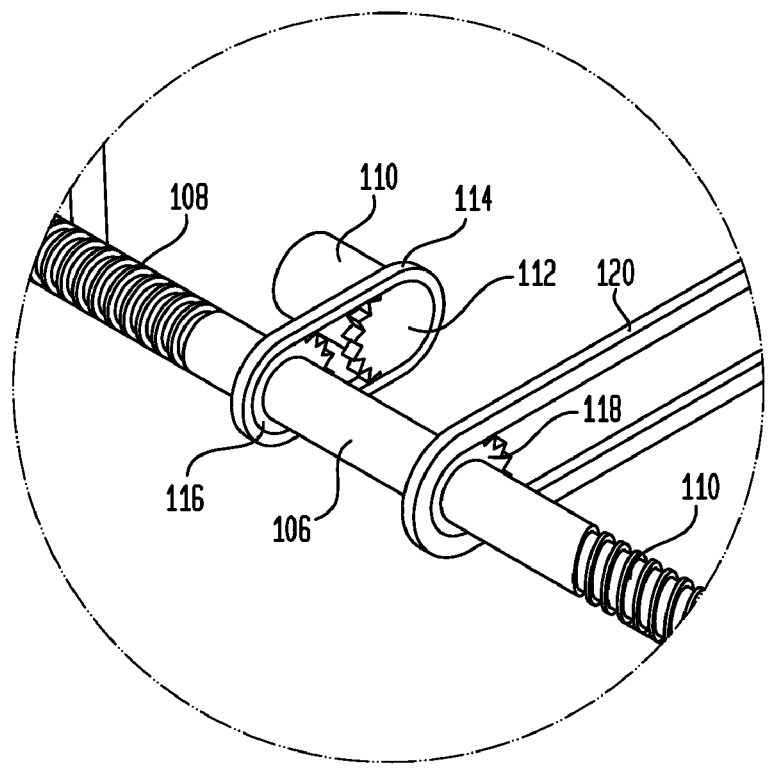
FIG. 7B is a detail view showing the relationship between the electric drive motor and the front lead screw of the embodiment shown in FIG. 7A.
Figure 7C:
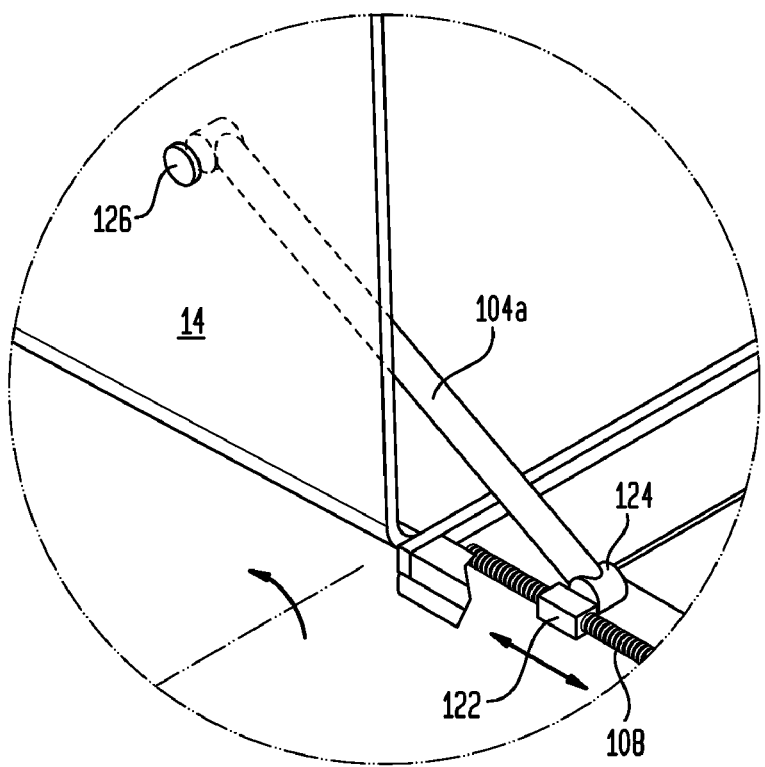
FIG. 7C is a detail view of the relationship between the lead screw and the front link that opens and closes the enclosure clamshell section.

An alternative embodiment of the invention 100 having an electric drive system is shown in FIGS. 7A-7C. Embodiment 100 includes clamshell sections 14 and 16 and a base 102. Links 104a and 104b connect clamshell section 14 to front lead screw 106 and rear lead screw 128, respectively. Similarly, links 104c and 104d connect clamshell section 16 to front lead screw 106 and rear lead screw 128, respectively. As shown in FIG. 7C, front link 104a is attached by a pivotable member to clamshell section 14 at one end and to a pivotable member 124 attached to a traveling nut 122 at the other. The remaining links 104b, 104c and 104d are attached to the clamshell sections and traveling nuts in a similar manner. Nut 122 engages the threads 108 on the front lead screw 106. As shown in FIG. 7B, the front lead screw has threads 108 at one end and threads 110 at the other. The threads 108 and 110 are formed in the opposite sense or directions so that rotation of the lead screw 106 causes the traveling nut 122 to move in a direction opposite from its twin (not shown) so that clamshell sections 14 and 16 open and close together. Lead screw 122 is driven by a an electric winch type motor 110 which has a gear 112 that engages a small chain 114 that in turn engages a drive gear 116 on lead screw 106. Lead screw 106 includes a second gear 118 that is attached to a chain 120 which engages a similar gear on the rear lead screw 128.

In operation, if the alternative embodiment 100 starts in the open state as shown in FIG. 7A, activation of motor 110, drives gear 112 and chain 114 to cause gear 116 and front lead screw 106 to rotate. That causes nut 122 to move inwardly towards motor 110 and draws the link 104a with it causing the clamshell section 14 to move toward the closed position. Simultaneously, the traveling nut connected to link 104c travels towards motor 110 because threads 110 are opposite in direction and sense to threads 108 thus drawing up clamshell section 16. Drive gear 118 and chain 120 transmit power to rear lead screw 128 which also draws in links 104b and 104d causing the other sides of clamshell sections 14 and 16 to close too. Continued activation of the motor 110 moves the clamshell sections to the intermediate position shown in FIGS. 1B and 2B where it pauses as before. The, starting the motor 110 again brings the clamshell sections 14 and 16 to the fully closed position as shown in FIGS. 1C and 2C. Reversing the motor 114 moves the enclosure 100 from the fully closed position of FIGS. 1C and 2C to the fully open position of FIGS. 1A and 2A again.

Figure 8B:
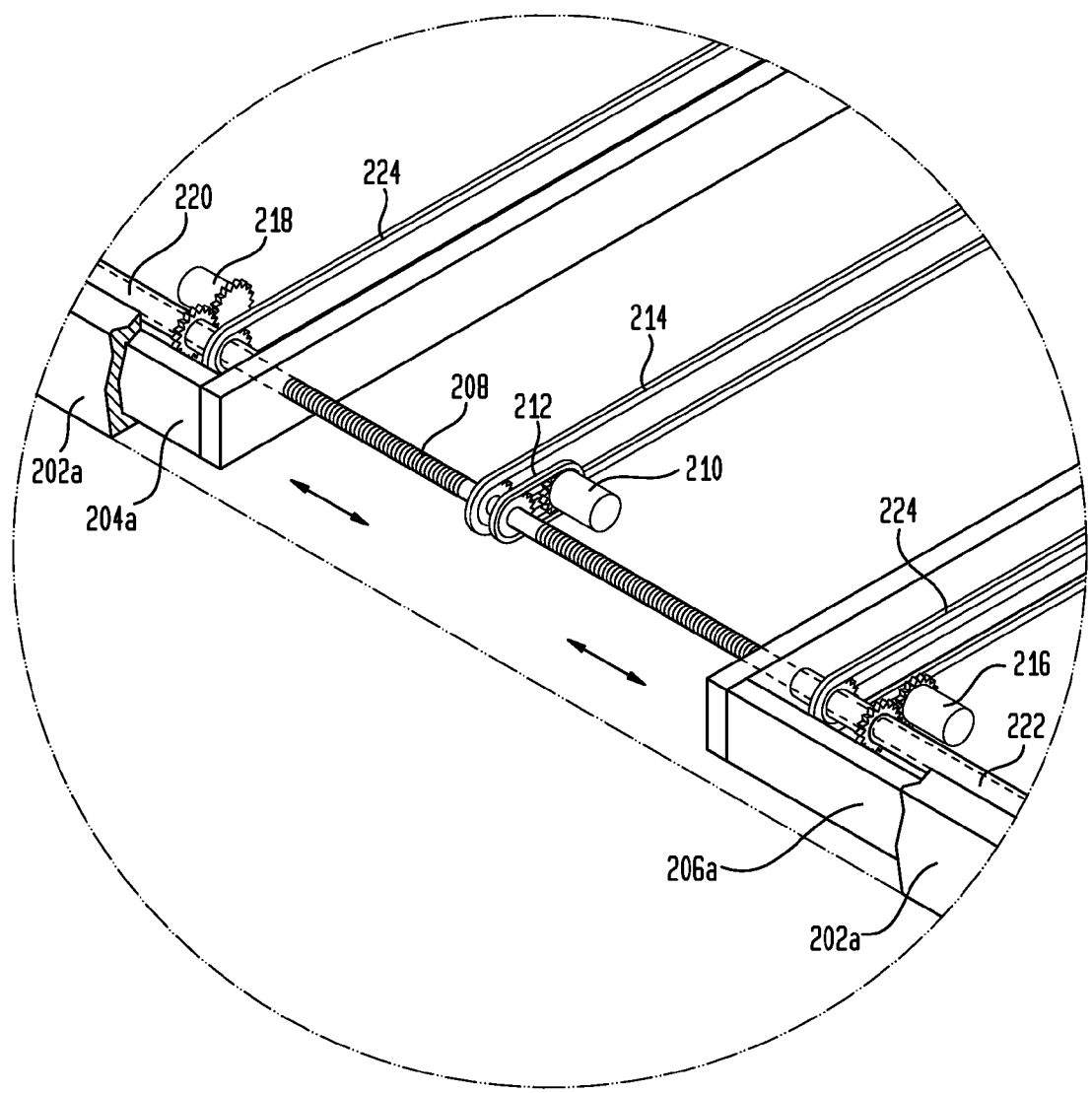
FIG. 8B is a detail view of the electrical drive motors employed in the expandable embodiment shown in FIG. 8A.

FIGS. 8A and 8B illustrate another alternative embodiment 200 of the basic invention 10 in which the electric drive system also drives an expandable landing base or pad. Embodiment 200 includes a front and rear L-shaped bracket 202a and 202b which house expandable brackets 204a, 204b, 206a and 206b. Links 104a and 104b connect clamshell section 14 to traveling nuts as they do in FIGS. 7A-7C and similarly links 104c and 104d connect clamshell sections 16 to traveling nuts too.

Details of the expandable embodiment 200 are better understood by referring to FIG. 8B. A lead screw 208 is drivable by a wench type electric motor 210. Motor 210 includes a drive gear attached to a drive chain 212 which in turn drives a gear attached to lead screw 208. Another chain 214 which engages a gear on lead screw 208 drives the rear lead screw which operates in a similar manner. Drive motors 216 and 218 drive hollow drive rods or sleeves 220 and 222 respectively. Hollow drive sleeve 220 and 222 receive lead screw 208 so that as the landing pad 12 expands and contracts as the lead screw moves in and out of the hollow cavity in drive sleeves 220 and 222. Hollow sleeves 220 and 222 have threads on the exterior to receive traveling nuts similar to nut 122 shown in FIG. 7C. Also attached to sleeve 220 is a gear and drive chain 224 to provide power to the rear link 104b. Similarly, a chain 224 picks power off of sleeve 222 to drive rear link 104d.

In operation, if the enclosure 200 begins in the closed state, as shown in FIGS. 1C and 2C, the pilot might activate the remote control 32 causing motors 216 and 218 to be energized and the clamshell sections 14 and 16 to move from the vertical closed position to the horizontal open position. After they are opened the motor 210 is energized driving lead screw 208 which in turn forced channels 204a and 206a away from each other in the direction of the arrows in FIG. 8B. This increases the effective size of the landing pad base 12 for the helicopter 50 to land on. To close the device 200, the motor 210 is reversed drawing the brackets 204a and 206a back towards each other. The motors 216 and 218 are then energized to bring the clamshell sections 14 and 16 back to the vertical closed position as seen in FIGS. 1C and 2C with a stop in the intermediate position as seen and previously described with respect to FIGS. 1B and 2B.

Another alternative clamshell drive mechanism 300a and 300b is illustrated in FIGS. 9A-12C. The first clamshell drive mechanism 300a is shown in FIGS. 9A and 9B. Drive mechanism 300a includes a hydraulic cylinder 302a having a piston or rod 308a extending out of one end thereof. The base portion of hydraulic cylinder 302a is attached to a pivot pin 312a which in turn is attached to a bracket tab 330a. Bracket tab 330a forms the upper part of the main hydraulic cylinder support bracket 314a. An upper L-shaped connection piece 316a is welded to the upper portion of the main hydraulic cylinder support bracket 314a. Similarly, a larger, lower L-shaped connection piece 318a is welded to the bottom portion of the main hydraulic cylinder support bracket 314a. An upper reinforcement and protection bar 324a is welded securely to both arms of the upper L-shaped connection piece 316a. Likewise, a lower reinforcement and protection bar 326a is welded securely to both arms of the larger lower L-shaped connection piece 318a. A diagonal cross support member 320a connects one arm of the upper L-shaped connection piece 316a to an arm of the lower L-shaped connection piece 318a. Hinge 322a attaches one arm of the lower L-shaped connection piece 318a to a bottom connection plate 304a. The piston rod 308a which emerges from hydraulic cylinder 302a is attached by a pivot pin 310a to piston block 328a. Main bracket 314a, bracket tab 330a, the upper L-shaped connection piece 316a, the lower L-shaped connection piece 318a, the diagonal support piece 320a, and the upper and lower reinforcement and protection bars 324a and 326a in combination form a cage 306a which protects the hydraulic cylinder 302a and absorbs all the stress of the opening and closing of the clamshell sections 14 and 16.

The second hydraulic clamshell drive mechanism 300b is shown in detail in FIGS. 10A and 10B. The elements that comprise the second hydraulic clamshell drive mechanism 300b are identical to those found in the first hydraulic clamshell drive mechanism 300a except that it has been configured to fit in the opposite corner of the cockpit pocket 60a of the clamshell section 16 as seen in FIG. 11. The helicopter cabin pocket 60a comprises a normally vertical wall portion 90 partially surrounded by a side wall section 92 which attaches the wall 90 to the rest of the clamshell 16. Sidewall section 92 is at approximately 90° with regard to wall 90. Clamshell section 14 also includes a helicopter cabin pocket 60b which is the mirror image of helicopter cabin pocket 60a. A second set of hydraulic clamshell drive mechanisms 300a and 300b are attached inside of cabin pocket 60b. Accordingly, this alternative embodiment includes a total of four clamshell drive mechanisms 300a and 300b.

The clamshell drive mechanisms 300a and 300b are attached in opposite corners of the cabin pocket 60a as shown in FIG. 11. One arm of upper L-shaped bracket 316a is attached to the back wall 90 as is one arm of the lower L-shaped bracket 318a. The opposite arms of upper L-shaped bracket 316a and lower L-shaped bracket 318a are attached to the sidewall section 92. In addition, the cross piece 320a is attached to the sidewall section 92. Finally the reinforcing rods 324a and 326a provide additional reinforcements to L-shaped brackets 316a and 318a. Altogether these elements form a very sturdy cage 306a which can apply a great deal of force to clamshell section 16 without damaging either the clamshell section 16 or the hydraulic cylinder 302a.

FIGS. 12A-12C illustrate how the hydraulic drive mechanisms 300a and 300b open the clamshell section 16. FIG. 12A shows the clamshell section 16 in the closed position. Wall 90 is shown approximately vertical to the ground. When hydraulic fluid is provided to cylinder 302a by a conventional hydraulic pump (not shown) through hydraulic fluid input port 336a the piston rod 308a extends and causes the clamshell section 16 to rotate in the direction of arrow 332. FIG. 12B shows the clamshell 16 in the half open, intermediate position. Continued application of hydraulic fluid to a cylinder 302a causes piston rod 308a to extend to its maximum length driving clamshell 16 further in the direction of arrow 332 to its full open position as shown in FIG. 12C. Closing is achieved by providing hydraulic fluid to the other port 338a and the steps shown in FIGS. 12A-12C are reversed.

The alternative embodiment illustrated in FIGS. 9A-12C has some important advantages over prior art inventions and over the drive mechanisms otherwise described in this disclosure.

First of all, this embodiment fits entirely inside of the clamshell housing. Without the cage structure, it would be necessary to employ a long piston arm to open and close the clamshell sections 14 and 16. Because of their length it would be necessary to place those arms outside of the structure but outside mounting is not preferred because it would exceed 102 inches, the maximum dimensions for an over the road load, without vehicle escort. Outside mounting also would leave the drive mechanisms exposed to weather elements, tampering, theft, etc.

Second, the cages, not the clamshell, absorb all the stresses upon opening and closing of the structure 14, 16. Accordingly, the clamshell 14, 16 can be constructed with material that is thinner and less robust. The clamshell 14, 16 rests on the lip of the bottom connecting plate 304a. This placement distributes the load of the clamshell 14, 16 much better and enhances smoother operation. More importantly, the cages substantially reduce the stress on the deck. In fact, a deck may not be required at all. The cages can be mounted to any sturdy surface such as a rooftop or ship deck. Since the cages absorb so much stress, the deck which is eventually used can be less substantially constructed and could easily be expandable in width if desired, giving the helicopter pilot more landing room.

Finally, with the cages absorbing the stresses, rather than the clamshells 14, 16 or the deck absorbing the stress, a more powerful cylinder 302a can be used with a much smaller arm 308a. Valuable landing space is conserved. All components remain inside the clamshell's 14, 16, a much preferred location and, because a thinner, less substantial clamshell is required, the surface upon which it rests does not have to support as much weight.

One major advantage of the expandable landing pad version 200 is that US highways normally do not allow trailed loads to exceed 102 inches in width. With embodiment 200, it is possible to collapse the enclosure 200 to a width of 102 inches or less and then deploy the enclosure 200 with a landing pad 12 exceeding 102 inches once the enclosure 200 reaches its final destination.

The invention 10 just described has a number of non-obvious advantages over prior art aircraft protection devices.

The major advantage of the invention 10 is that it allows the helicopter pilot to land directly on the storage unit so that the helicopter 50 does not have to be moved after landing—thereby avoiding an additional step that could cause harm to the helicopter 50 and the pilot. In its simplest context it would be a four (4) step process. First, the pilot merely presses the remote controller button 32 causing the clamshell apparatus 10 to open while the helicopter 50 is in flight. Second, the pilot lands the helicopter 50 directly on base 12 and gets out. Third, the pilot pushes button 18 or activates remote control switch 32 and the clamshell 10 closes to its intermediate position shown in FIGS. 1B and 2B so that the pilot can adjust the rotors 52 and 54 and make a final inspection before the fourth step which comprises pushing the button 18 or activates remote control switch 32 one last time causing the clamshell sections 14 and 16 to close all the way as shown in FIGS. 1C, 2C and 5A. Ideally, the whole process could take five minutes or less. That could clearly be important in military conditions or if severe weather is coming.

Other advantages of the of these embodiments include: the ability to encapsulate a helicopter, entirely and completely; the ability to protect the helicopter from elements and tampering and wildlife; and the ability to ship the helicopter in the case, without disassembling the helicopter.

These advantages coupled with the economy of construction make the case 10 significantly less expensive than hangar space. Where the user prefers to hangar the aircraft 50, the encapsulation inside of the shells 14 and 16, protects the aircraft 50 from potential damage from "hangar rash." Severe hangar rash can not only be expensive but damage to a critical part can be fatal to a helicopter in flight.

Another important aspect of the invention is that it is possible to keep the width of the clamshell enclosure to 102 inches which is the maximum permissible towing width over United States highways without an escort. This means that it is possible for an owner to tow his or her helicopter in the clamshell case from home to a local airport, open up the enclosure, take off, land, close the enclosure and tow the helicopter back home again.

It is also important to understand that the enclosure completely surrounds and completely protects the helicopter when the clamshell is closed. Therefore, the helicopter can also double as a domestic or overseas shipping container for the helicopter stored inside of it. The United States is the largest manufacturer of helicopters in the world and perhaps as many as 80% of US production is shipped overseas, according to informal sources of data on the matter. Accordingly, it is possible for a manufacturer to package the helicopter in the USA in the clamshell enclosure of the current invention, tow it to a port, ship it overseas, and deliver it to a foreign purchaser who reuses the enclosure for storage purchases at the ultimate destination. All of the foregoing save a great deal of energy and money.

Lastly, there is an additional economic advantage. Helicopter owners traditionally pay rent to third party owners of hangars. These rent payments are expensive and provide no lasting equity to the helicopter owner. The storage case 10 according to the preferred embodiment of the invention can be purchased by the owner and can be moved from airport to airport or other suitable landing zones. There is reduced wasted overhead in form of rent.

While the invention has been described with reference to the preferred embodiment thereof, it will be appreciated by those of ordinary skill in the art that modifications can be made to the invention, and parts thereof, without departing from the spirit and scope of the invention itself.

What is claimed:

1. A clamshell case apparatus (10) for protecting a helicopter (50) comprising:
   a base (12) having a front, a back, a top, a bottom, a first edge, and a second edge located opposite said first edge, said first and second edges extending between said front and back;
   a first side section (14) having an exterior and a substantially concave interior (62a, 62b) and attached by a first hinge (72a, 40a) to said first edge of said base 12; and
   a second side section (16) having an exterior and a substantially concave interior (60a, 60b) and attached by a second hinge (72b, 40b) to said second edge of said base 12,
   wherein said case apparatus (10) has an open position for receiving said helicopter (50) on said base (12) and a closed position wherein said first (14) and second (16) side sections are rotated towards each other substantially enclosing said helicopter (50) in the concave interiors (60a, 60b, 62a, 62b) of said first (14) and second (16) side sections.

2. The apparatus (10) of claim 1 further comprising:
   drive means (20) attached to said first and second side sections for driving said first and second side sections into said closed position.

3. The apparatus (10) of claim 2 wherein said drive means comprises a hydraulic motor (26a, 26b).

4. The apparatus (10) of claim 2 wherein said drive means comprises a pneumatic motor.

5. The apparatus (10) of claim 2 wherein said drive means comprises a hand operated crank mechanism.

6. The apparatus (10) of claim 3 further comprising:
   a remote control means (24, 32) for wirelessly operating said hydraulic motor (26a, 26b).

7. The apparatus (10) of claim 6 wherein said first (14) and second (16) side sections are substantially rigid and substantially mirror images of each other.

8. The apparatus (10) of claim 7 wherein said base (12) includes rail means (68a, 68b) attached between said base (12) and side sections (14) and (16) respectively for extending the width of said base (12) in order to give a helicopter (50) a bigger, safer target to land on.

9. The apparatus (10) of claim 8 further including a removable port (16a) in the side (16) of at least one side section (14, 16) for accessing said helicopter (50) when said apparatus (10) is in the closed position.

10. The apparatus (10) of claim 9 wherein helicopter (50) has rotors (52, 54) and said drive means (20) drives said side sections (14, 16) to a position intermediate said open and closed positions and automatically stops there so that said rotors (52, 54) can be properly aligned before final closure of the case apparatus (10) thereby avoiding damage to said rotors (52, 54).

11. The apparatus (10) of claim 10 further comprising:
    a climate control means (76, 78) located at least partially inside of said apparatus (10) when said apparatus (10) is in the closed position for controlling the climate inside of said closed apparatus (10).

12. The apparatus (10) of claim 2 wherein said drive means comprises an electric drive means.

13. The apparatus (10, 100) of claim 12 wherein said electric drive means comprises:
    at least one electric drive motor (110, 216, 218);
    a threaded rod (106, 128, 208) drivable by said one electric drive motor (110, 216, 218);
    a rotatable nut (122) for engaging the threads (108) on said threaded rod (106, 108, 208); and
    a link (104a, 104b, 104c, 104d) attached at one end to a side section (14, 16) and the other end to said nut (122),
    wherein activation of said motor (110, 216, 218) causes said link (104a, 104b, 104c, 104d) to move the side section (14, 16) from a closed state to an open state and vice versa.

14. The apparatus (10, 200) of claim 12 further comprising:
    an electric motor means (210);
    a threaded rod (208) drivable by said electric motor means (210); and
    at least one hollow sleeve (220, 222) having threads on the outside thereof and threads on the inside thereof and wherein said threaded rod engages the threads on the inside of said hollow sleeve (220, 222) and wherein said hollow sleeve (220, 222) supports part of said base (12),
    wherein activation of said motor (210) causes said base (12) to split and move apart thereby increasing the landing area of said base (12).

15. A method of protection a helicopter (50) comprising the steps of:
    a. landing a helicopter (50) on an enclosure (10) including a base (12) and a pair of clamshell sections (14, 16) pivotable attached to opposite sides of the base (12), wherein the clamshell sections (14, 16) are in a first, open position; and
    b. rotating the two clamshell sections (14, 16) towards each other until the two sections (14, 16) mate in a second, closed position wherein the helicopter (50) is substantially, completely enclosed in said enclosure (10).

16. The method of claim 15 further comprising the step of:
    c. automatically stopping the rotation of the two sections (14, 16) towards each other at a third position which is part way between the positions of steps a. and b. above in order to inspect the helicopter (50) and make necessary adjustments so that the helicopter (50) fits in the enclosure (10) without interference when the enclosure (10) is closed.

17. A clamshell case apparatus for protecting a helicopter comprising:
    a base having a front, a back, a top, a bottom, a first edge, and a second edge located opposite said first edge;
    a first side section having an exterior and a substantially concave interior and attached by a first hinge to said base;
    a second side section having an exterior and a substantially concave interior and attached by a second hinge to said base; and,
    a hydraulic drive means located inside of said first and second side sections for driving said first and second side sections into and out of a closed position,
    wherein said case apparatus has an open position for receiving said helicopter on said base and a closed position wherein said first and second side sections are rotatable by said hydraulic drive means towards each other substantially enclosing said helicopter in the concave interiors of said first and second side sections.

18. The apparatus of claim 16 wherein each of said sidewall sections include a pocket for surrounding the cabin of said helicopter when said clamshell is closed and wherein said pockets include an outer wall and an inner sidewall connected to said outer wall and wherein at least a portion of said sidewall is substantially at 90 degrees with respect to said outer wall.

19. The apparatus of claim 17 wherein said hydraulic drive mechanisms include hydraulic cylinders housed in a cage which is attached to both said outer wall and said sidewall of said helicopter cabin pocket and wherein said cage absorbs the majority of the stress associated with the opening and closing of said clamshell case apparatus.

20. The apparatus of claim 18 wherein said hydraulic cylinders each includes a base end and a piston rod and wherein said base end is attached by a first pivot pin to said cage and piston rod is attached by a second pivot pin to said base.

21. The apparatus of claim 19 further comprising;
a block for attaching said second pivot pin to said base.

* * * * *